(12) United States Patent
Lee

(10) Patent No.: US 7,075,985 B2
(45) Date of Patent: Jul. 11, 2006

(54) METHODS AND SYSTEMS FOR EFFICIENT VIDEO COMPRESSION BY RECORDING VARIOUS STATE SIGNALS OF VIDEO CAMERAS

(76) Inventor: Chulhee Lee, 509-204 Dongbu-Apt, Gangsun-Maeul, Joojeob-Dong, Goyang-City, Gyounggi-Do (KR) 411-744

( * ) Notice: Subject to any disclaimer, the term of this patent is extended or adjusted under 35 U.S.C. 154(b) by 802 days.

(21) Appl. No.: 09/962,106

(22) Filed: Sep. 26, 2001

(65) Prior Publication Data

US 2003/0058347 A1    Mar. 27, 2003

(51) Int. Cl.
*H04N 7/12* (2006.01)

(52) U.S. Cl. ............. 375/240.12; 375/240; 375/240.01

(58) Field of Classification Search ............... 375/240, 375/240.01, 240.12; 348/143, 154, 43
See application file for complete search history.

(56) References Cited

U.S. PATENT DOCUMENTS

| 5,272,527 A | * | 12/1993 | Watanabe | 348/154 |
| 5,612,735 A | * | 3/1997 | Haskell et al. | 348/43 |
| 5,926,209 A | * | 7/1999 | Glatt | 348/143 |

* cited by examiner

*Primary Examiner*—Allen Wong

(57) ABSTRACT

Methods and systems for efficient video compression by recording various state signals of cameras. In accordance with the teaching of the present invention, a video camera with means to record the movement, zooming state, focus state, and aperture state of the video camera is provided. The luminous intensity, camera identification number and frame index are also recorded. These various state signals are recorded along with video and audio signals on recording media, such as magnetic tapes, memory cards, and hard drives in a predetermined data format. Additionally, video compression algorithms, which utilize such state signals to predict the current frame from previous reconstructed images, are provided. In particular, the information on the various states of the video camera is useful in obtaining accurate motion compensated images.

8 Claims, 17 Drawing Sheets

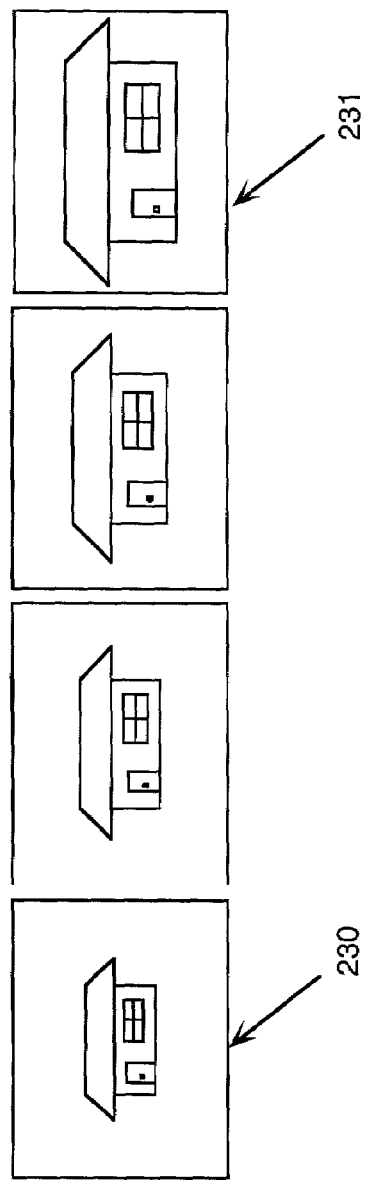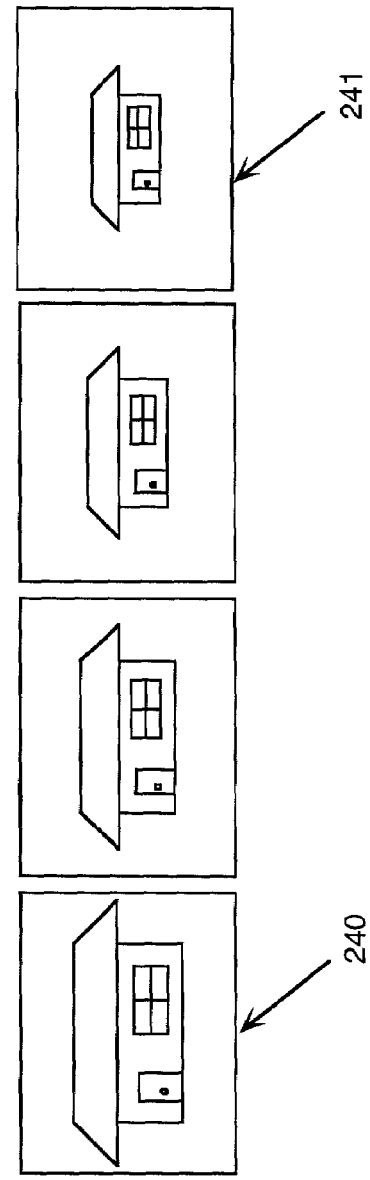

METHODS AND SYSTEMS FOR EFFICIENT VIDEO COMPRESSION BY RECORDING VARIOUS STATE SIGNALS OF VIDEO CAMERAS

BACKGROUND OF THE INVENTION

1. Field of the Invention

This invention relates to methods and systems for efficient video compression by recording various state signals of a camera, which include luminous intensity, frame index, movements of the camera, zooming state of the camera, aperture state of the camera, focus state of the camera and camera identification number of the camera. In particular, the camera records these state signals along with video and audio signals, and video compression algorithms utilize such state signals to predict the current image from previous reconstructed images.

2. Description of the Related Art

Recent advancements in digital technology make it possible to record video signals in digital formats. Most video signals can be viewed as a sequence of still images, each of which is called a frame. For typical video signals, there are 25–30 frames per second. Sometimes, video signals may be represented as a sequence of fields. Since fields are created by dividing each frame into a set of two interlaced fields, the idea and teaching of the present invention are also applied to the field-based video signals. Although the following description will be described mainly in terms of frame-based video signals, it is emphasized that the teaching of the present invention can be applied to both frame-based and field-based video signals. Sometimes, the terminology "image" will be used and it may be interpreted as either a frame or a field.

For the standard definition television, there are several hundreds of thousands of pixels in each frame and color video signals have three channels. Thus, the bandwidth of digital video signals can be very large. In order to save such a large amount of digital video signals in digital formats, video compression techniques must be employed.

Most video compression algorithms try to reduce spatial, spectral and temporal redundancies in video signals. The spatial redundancy is a redundancy within a frame and the temporal redundancy is a redundancy among successive frames. In general, the compression algorithms, which have been proposed to reduce the spatial redundancy within a frame, utilize transform coding, quantization and variable length coding. Two of the most widely used transforms are the discrete time cosine transform, which is extensively used in JPEG and MPEG, and the wavelet transform. Some of the most widely used variable length coding algorithms include Huffman coding and arithmetic coding. Due to their importance, numerous coding algorithms have been proposed for still images.

Since there are 25–30 frames per second for typical video signals, successive frames in video signals are highly correlated. In other words, successive frames are very similar. In particular, if there is no moving object, successive frames will be identical assuming that the camera states, which include its zooming state, focus state, aperture state and the position of the camera, are unchanged and that the surrounding light condition remains the same. If there is a moving object, successive frames will be different due to the motion of the moving object. However, if the motion of the moving object can be estimated, one can predict the location of the moving object in the current frame from previous reconstructed frames. Then, the difference image between the current image and the predicted image is computed and transmitted instead of transmitting the original image. The operation to predict the current image from the previous reconstructed images using motion vectors is called motion compensation and is a key element in video compression algorithms. A block diagram of a typical video encoder utilizing the motion compensation is shown in FIG. 1, where DCT 100 represents the discrete cosine transform, Q 101 quantization, VLC 102 variable length coding, $Q^{-1}$ 103 inverse quantization, and IDCT 104 the inverse discrete cosine transform. If the prediction is good, the pixel values of the difference image will be very small and the difference image can be very efficiently encoded, resulting in a significant reduction in data size. Thus, the key idea in reducing the temporal redundancy in video signals is to estimate motion vectors between successive frames and to use the information to make a good prediction of the following image. In practice, the motion estimation can be done in both the forward direction and backward direction. Due to their importance in video coding, numerous motion estimation and compensation algorithms have been proposed. One of the most widely used motion estimation algorithms is the block matching algorithm. In the block matching algorithm, a frame is divided into a number of blocks and the motion estimation is performed for each block. However, there are many problems with the current motion estimation and compensation algorithms. First of all, an accurate estimation of the motion of moving objects is a very difficult task. Furthermore, the motion estimation is a very time-consuming process, consuming a significant portion of the processor power.

In general, there are many factors that cause differences in successive frames. Obviously, if there is a moving object, successive frames will be different. Sometimes, an object of interest may be moving toward or away from the camera, thereby resulting in differences in successive frames. However, there are other factors, too. For instance, if the camera is panned, successive frames will be different. If the zooming or aperture states are changed, successive frames will change accordingly. On the other hand, a change in the surrounding light conditions also causes differences in successive frames. Since there are so many factors that make successive frames different, it is very difficult to estimate motion vectors accurately. However, if information on those various states of the camera is available, the motion estimation can be performed more easily and accurately. In other words, if information on the various states of the camera is available, this information can be effectively used in predicting the current image from previous reconstructed images. Fortunately, the information on the movement, zooming state, focus state, aperture state of the camera and the information on luminous intensity can be readily obtained and recorded.

A typical motion picture is produced by editing parts from video signals taken by a number of cameras. Quite often, video signals from several cameras are alternately concatenated. Generally, when video signals from several cameras are alternately concatenated, it is of no use to try to predict the first frame after a boundary from previous reconstructed frames before the boundary. For instance, the first frame after the boundary may not be predicted from frames taken by a different camera. In this case, most video compression algorithms give up trying to predict the current frame from the previous reconstructed frames and just transmit the first frame without any motion compensation. However, transmitting the original image without motion compensation significantly increases the data size. However, if video signals from several cameras are alternately concatenated, the first frame after the boundary can be accurately predicted some of the previous frames that were taken by the same camera. For instance, in FIG. 7, the first frame 170 of VIDEO 3 can be predicted from the last frame 171 of VIDEO 1 and the first frame 172 of VIDEO 4 from the last frame 173 of VIDEO 2. Thus, if one can determine which frames were taken by the same camera, such information will be very useful for predicting the first frame after the boundary 175. For this purpose, the present invention records a frame index and a camera identification number for each frame. In other words, according to the teaching of the present invention, a different camera identification number is assigned to each camera and each camera records the camera identification number and the frame index to each frame.

Therefore, it is an object of the present invention to provide a video camera that has means to record the frame index, camera identification number, movement, zooming state, focus state, aperture state of the camera, and the luminous intensity along with audio and video signals. Another object of the present invention is to develop video compression algorithms that use such information for efficient video compression.

SUMMARY OF THE INVENTION

In accordance with the teaching of the present invention, a video camera with means to record the movement, zooming state, focus state, and aperture state of the camera is provided. Luminous intensity, camera identification number and frame index are also recorded. These various state signals are recorded along with video and audio signals on recording media such as magnetic tapes, memory cards, or hard drives according to a predetermined data format. In addition, video compression algorithms, which utilize such state signals to predict the current image from previous reconstructed images, are provided. In particular, the information on the various states of the camera is used to obtain accurate motion compensated images.

The other objects, features and advantages of the present invention will be apparent from the following detailed description.

BRIEF DESCRIPTION OF THE DRAWINGS

FIG. 12 shows how images change when the camera is zoomed in.

FIG. 14 shows a sequence of images obtained by the zoom-in operation.

FIG. 15 shows a sequence of images obtained by the zoom-out operation.

DESCRIPTION OF THE ILLUSTRATED EMBODIMENTS

Embodiment 1

Typical video signals can be viewed as a sequence of still images, each of which is called a frame. Sometimes, video signals may be represented as a sequence of fields. Since fields are created by dividing each frame into a set of two interlaced fields, the idea and teaching of the present invention are also applied to the field-based video signals. Although the following illustrated embodiments will be described in terms of frame-based video signals, it is emphasized that the teaching of the present invention can be applied to both frame-based and field-based video signals. Furthermore, "frames" and "images" will be used interchangeably if such a use does not cause any ambiguity. Sometimes, the terminology "image" will also be used and it may be interpreted as either a frame or a field. In addition, "cameras" and "video cameras" will be used interchangeably if such a use does not cause any ambiguity.

One of the key elements in video compression algorithms is to reduce temporal redundancies. This reduction in temporal redundancies is achieved mainly by encoding difference images instead of the original images. In other words, due to the relatively high correlation among successive images, pixel values of the difference image will be much smaller than those of the original image. Therefore, encoding the difference image instead of the original image may result in a smaller data size. However, if there is a moving object, encoding the difference image instead of the original image can result in a larger data size since the difference image may contain more details. In order to address this problem, motion compensation algorithms have been used. Basically, in a motion compensation algorithm, the motion of a moving object is taken into account in predicting the current frame from the previous reconstructed frames. Thus, with an efficient motion compensation algorithm, pixel values of difference images can be reduced considerably. A block diagram of a typical video encoder utilizing a motion compensation algorithm is shown in FIG. 1.

Figure 1:
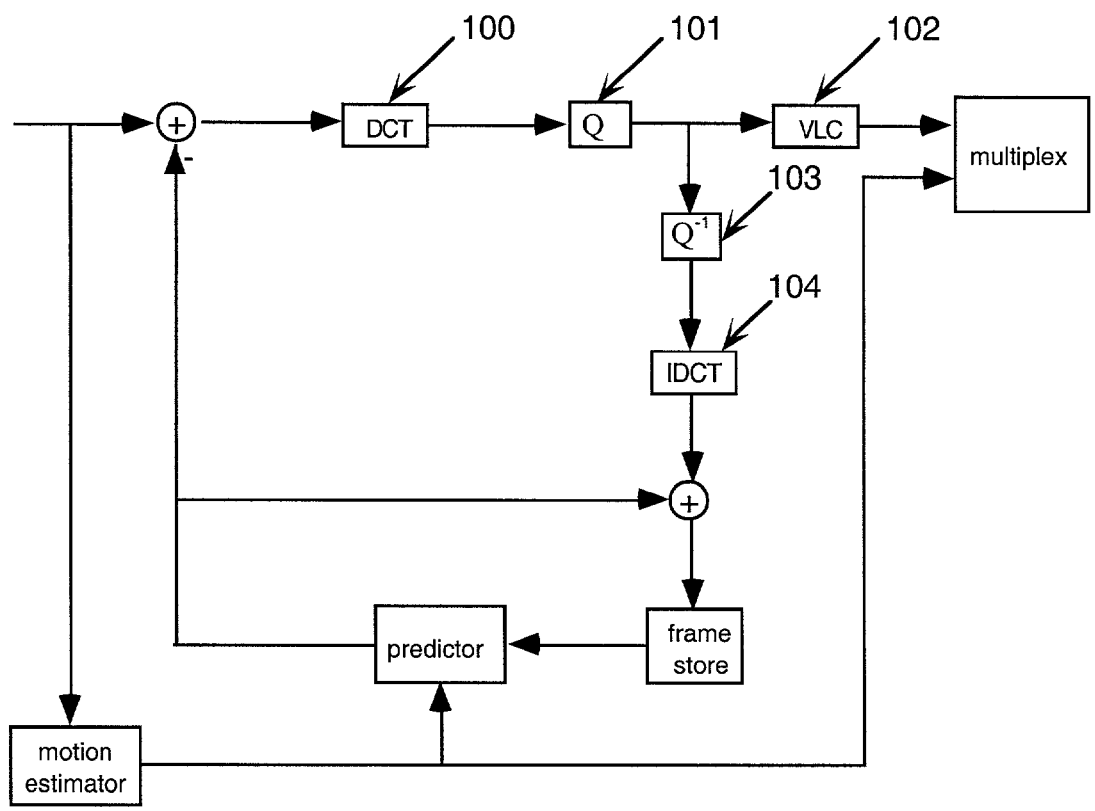
FIG. 1 shows a block diagram of a typical video encoder utilizing motion compensation.
Figure 2:
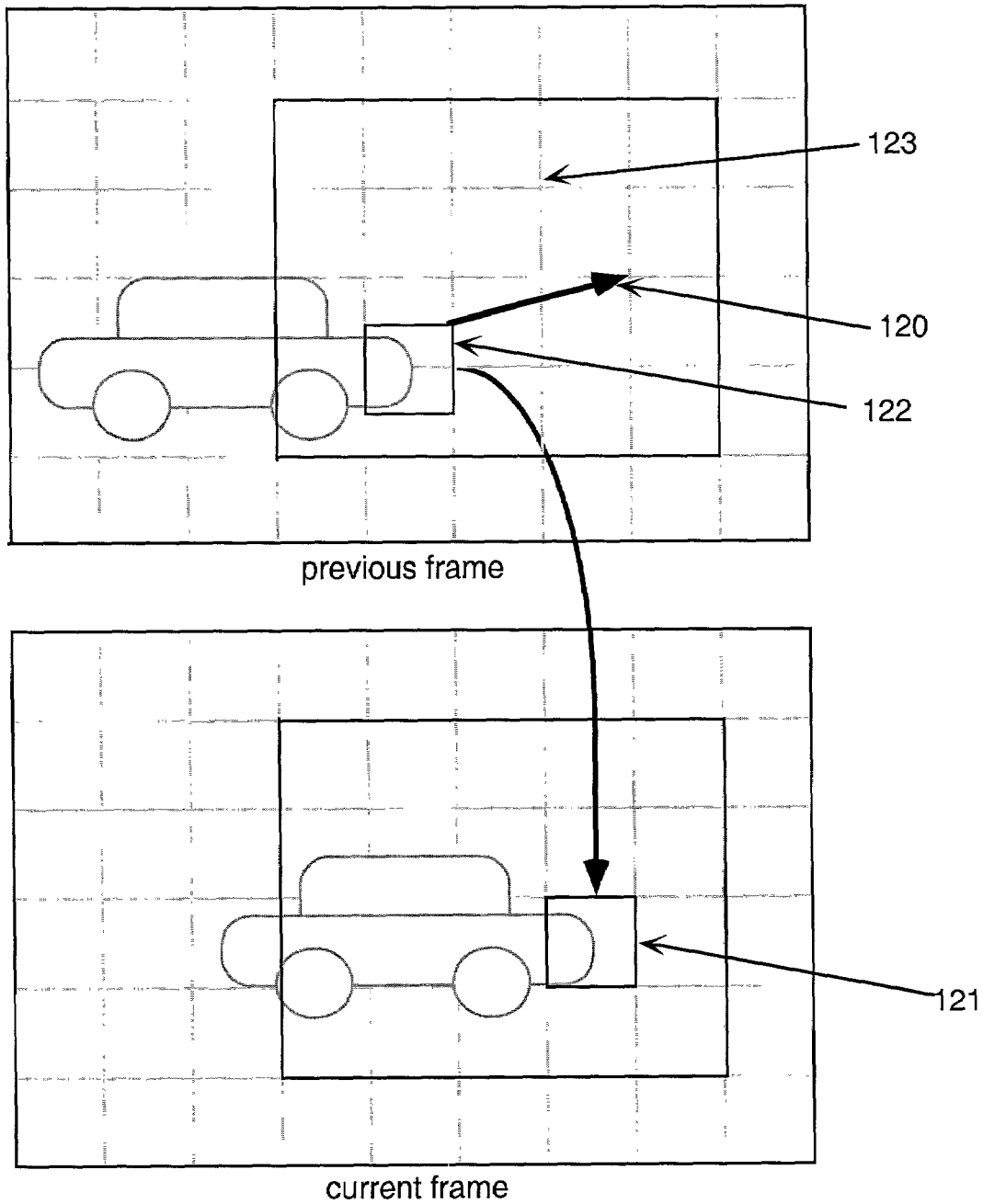
FIG. 2 shows an example of the block matching algorithm.

As can be seen in FIG. 1, the previous reconstructed frames are used to predict the current frame. In many video compression algorithms, the block matching algorithm is widely used for motion estimation. In the block matching algorithm, a frame is divided into a number of blocks and motion estimation is performed for each block (FIG. 2). In other words, for each block being coded, the block matching algorithm searches the previous reconstructed frames for a block of the same size that most closely matches the block being encoded 121, and then the motion vector 120 is transmitted. The motion vector 120 indicates the relative displacement between the block to be used for prediction 122 and the block being encoded 121. In order to reduce the search time, many motion estimation algorithms restrict the search area 123. Although the motion estimation is performed in the forward direction in FIG. 2, it can also be performed in the backward direction. Thus, the idea and teaching of the present invention are applied to motion estimation in both the forward direction and backward direction.

However, there are many problems with current motion estimation and compensation algorithms. First of all, motion estimation is a difficult problem and one of the primary factors in determining the performance of a video compression algorithm. Furthermore, motion estimation is one of the most time-consuming operations in video compression and requires a powerful processor for good motion estimation. Thus, if the motion estimation could be done more efficiently, it would significantly increase the performance of video encoders. In other words, video signals can be highly compressed without sacrificing video quality. Secondly, the motion estimation is a limiting factor in the performance of a video camera that has video compression capability since the processor equipped to a video camera has more limited processing power than desktop computers. In other words, in order to obtain good motion estimation, the video camera needs a fast processor and such a fast processor tends to consume a considerable amount of battery power, which is a limited resource in a portable video camera. Thus, efficient motion estimation can significantly enhance the performance of video cameras-that have video compression capability.

If there were no moving object in a fixed surrounding and all the states of the camera were the same, successive frames would be identical and difference images would be zero. Such a sequence of frames can be very effectively compressed. In general, there are several factors that cause differences in successive frames. First, if there is a moving object, successive frames will be different. However, there are other factors, too. For instance, if the camera is panned or moved, successive frames will be also different. In addition, if the zooming state or aperture states of the camera are changed, successive frames will also change accordingly. However, there are some differences in these factors that cause differences in successive frames. A moving object in a scene is beyond the control of the cameraman. In other words, the differences in successive frames due to the motion of a moving object can at best be estimated. On the other hand, the movement of a camera can be accurately measured and recorded. From this measurement, differences in successive frames due to the movement of a camera can be predicted easily with a good accuracy. Similarly, changes in the zooming state or aperture state can be easily measured and recorded. The corresponding differences in successive frames can also be predicted accurately.

Meanwhile, if the focus state of the camera changes, this indicates that the object of interest is moving toward or away from the camera. This change in the focus state can be also measured and recorded. This information on the change of focus state will be also useful in predicting differences in successive frames, resulting in good motion-compensated images. Furthermore, changes in surrounding light conditions also cause differences in successive frames. Since surrounding light conditions can be easily measured by a photometer, which a typical camera is already equipped with, this information can be also recorded and used to predict differences in successive frames. Thus, in the present invention, the movement, zooming state, focus state, and aperture state of the camera along with information on luminous intensity are measured and recorded along with video and audio signals. This information can be effectively used in motion estimation and video compression.

The movement of the camera can be measured using a navigation system, such as an inertial navigation system or systems using GPS (global positioning satellite). However, navigation systems using GPS may be not adequate since an accurate measurement of the movement of the camera is required for a good motion estimation, which is in turn necessary for efficient video compressions. Furthermore, GPS may not be available inside buildings where many motion pictures are taken. Thus, accurate inertial navigation systems are best suited for the present invention. For example, a gyroscope and an accelerometer can be used to detect movement of the camera.

Figure 3:
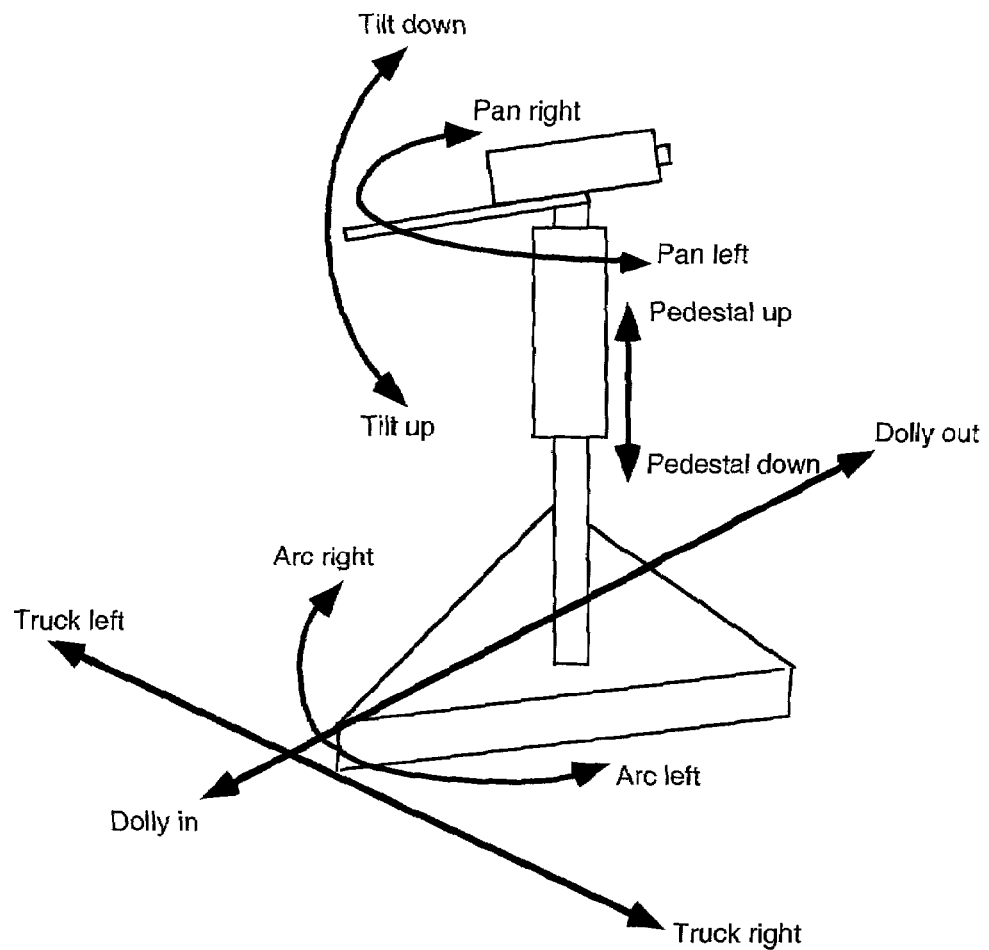
FIG. 3 illustrates the major camera movements.
Figure 4:
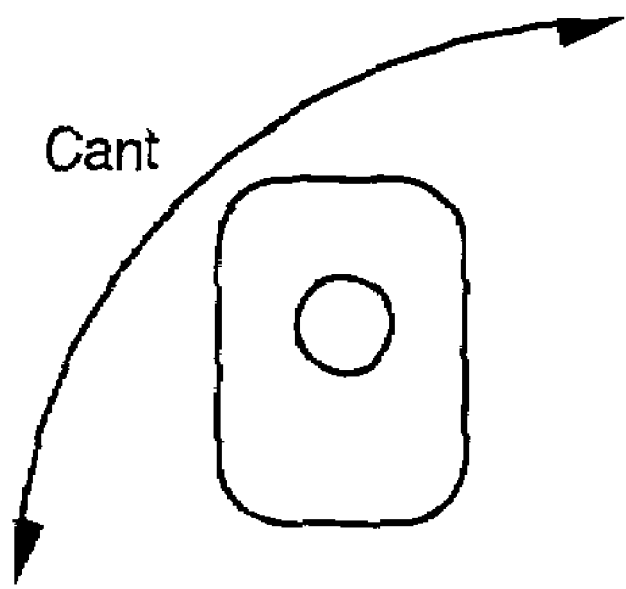
FIG. 4 illustrates the cant operation of camera movements.
Figure 5:
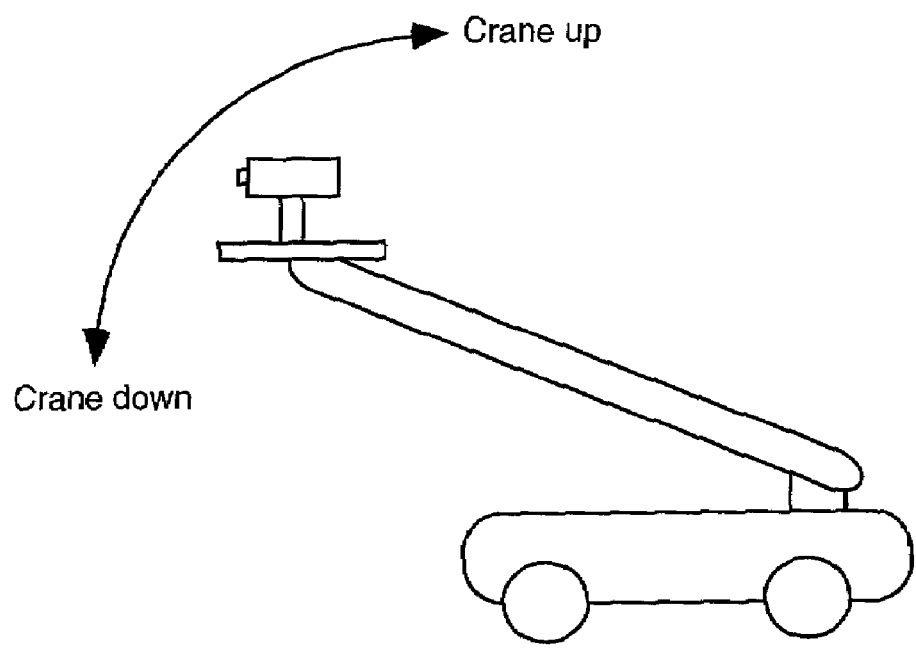
FIG. 5 illustrates the crane-up and crane-down operations.
Figure 6:
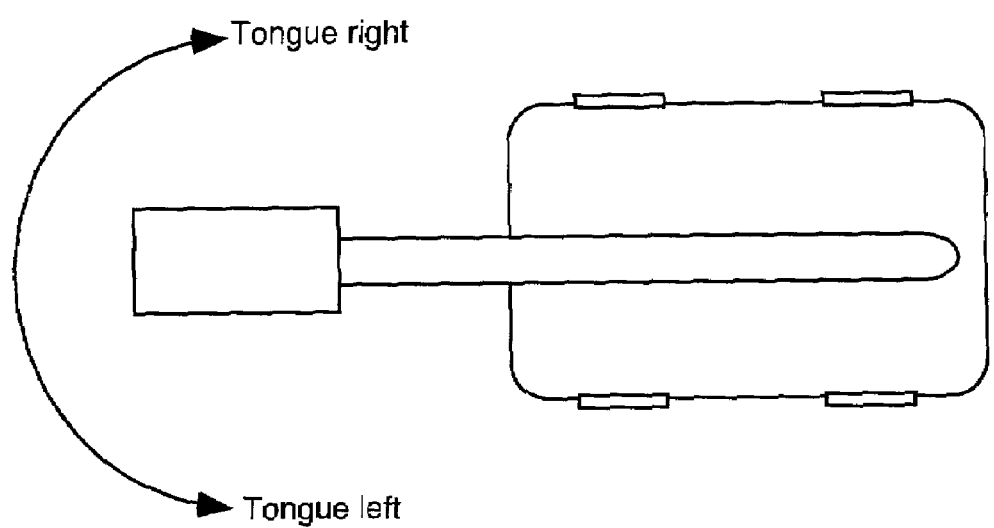
FIG. 6 illustrates the tongue right and tongue left operations.

In general, the movement of the camera can be very complicated. The major camera movements are illustrated in FIGS. 3–6. As can be seen in FIG. 3, the camera may be panned right or left. It can be tilted up or down. It can be trucked left or right. It can be moved up (pedestal up) or down (pedestal down). The camera may be also moved forward (dolly in) or away from (dolly out). It can be arced right or left. The camera can be moved right (truck right) or left (truck left). Furthermore, one may also tilt the camera sideways (cant) as shown in FIG. 4. When a crane is used (FIGS. 5–6), the camera movements also include crane up (FIG. 5), crane down (FIG. 5), tongue left (FIG. 6) and tongue right (FIG. 6). In other words, the movement of the camera is 3-dimensional and more than one gyroscope may be needed to measure accurately the movement. In general, the movement can be measured in three directions: toward-backward, upward-downward, and rightward-leftward. However, an accurate gyroscope is expensive and may consume a significant amount of power. Thus, accurate gyroscopes may be used if the camera is intended for the professional use, whereas inexpensive gyroscopes that consume less power may be more suitable for consumer electronics. Fortunately, most current video cameras are already equipped with an apparatus for detecting and correcting hand quiver, and such an apparatus requires some kind of gyroscope. If a video camera is already equipped with gyroscopes, they can be used to detect and measure the movement of the camera, and the camera movement signals can be recorded along with the video and audio signals. Furthermore, if a video camera is mounted on mounting equipment such as a studio pedestal or a camera crane, then the movement of the camera can be accurately measured with respect to the mounting equipment. If the camera is moved on rails, then the movement of the camera can also be measured easily.

If the camera is in motion when the recording is started, the inertial navigation system will consider the initial moving state to be a reference state. For example, if the cameraman is on a moving vehicle and starts recording while the vehicle is moving at a relatively constant speed, the inertial navigation system may assume that the camera is at rest even though it is moving with respect to the objects being recorded. In such a case, initial state entering means is provided. For instance, the camera can be aligned to the direction of movement and the initial speed can be entered using input means.

Figure 16:
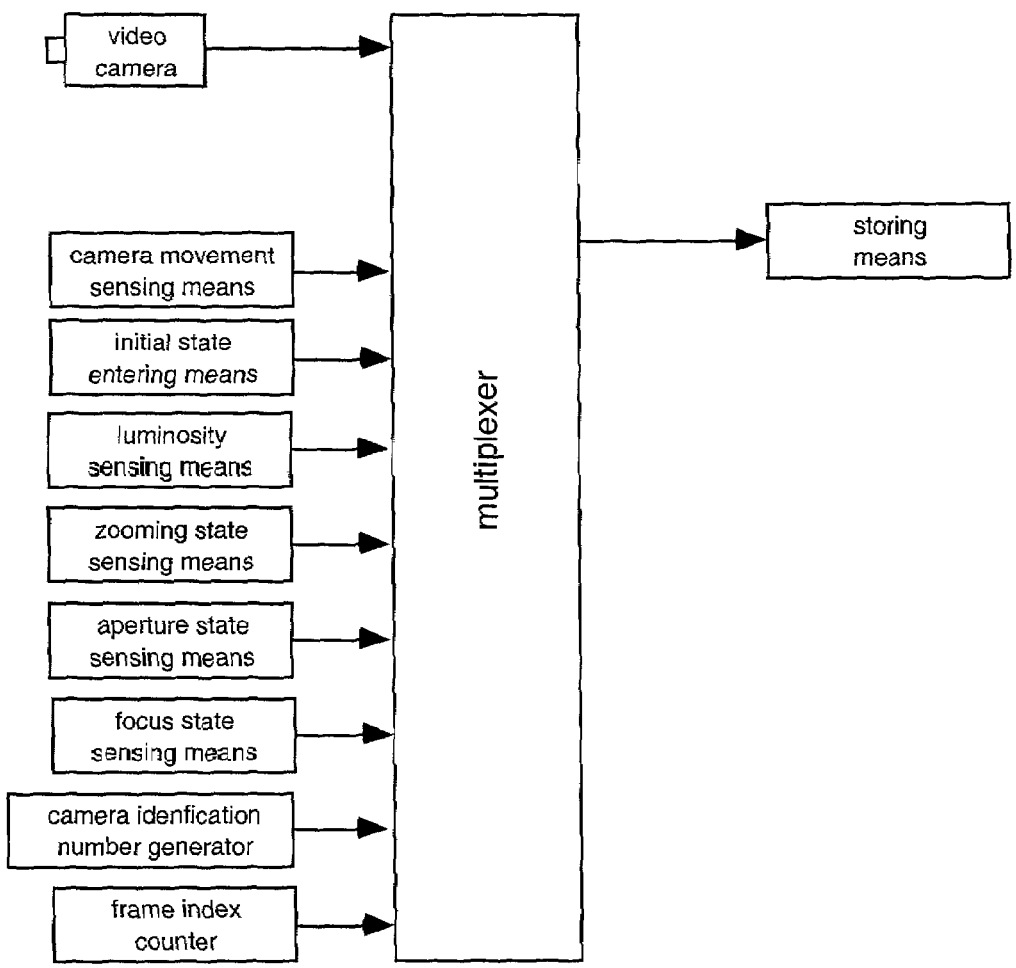
FIG. 16 shows how the various state signals are combined and stored.

The other state signals (zooming state signals, focus state signals, aperture state signals and etc.) are also readily available. These state signals are already measured for other purposes or can be easily measured. For instance, the zooming state can be measured with zooming state sensing means that reads the current zooming state of the zooming lens. The focus state can be read with a sensor that reads the current focus state of the camera. And the aperture state can be read with a sensor that reads the current aperture state of the camera. However, as stated previously, most of these state signals are already measured and used for other purposes. For instance, the zooming state is constantly measured and displayed in the viewfinder. The focus state is constantly measured and used for the auto-focus operation. And the aperture state and luminosity are measured and used for the auto-exposure operation. The present invention collects these state signals and records them along with video and audio signals. FIG. 16 shows how these signals are measured, combined, and stored. First, the various state signals are collected along with the video and audio signals, and all the signals are combined together. Then, the data is stored in a storage media according to a predetermined data format.

In this invention, the term, "motion picture," means the final product of videos. It includes movies, dramas, sports, shows, and etc. As used herein, the term "camera-scene" will be understood to indicate a segment of video signals which is taken by a camera at a specific location and time so that the frames within the same camera-scene are expected to be similar. More particularly, successive frames within the same camera-scene would be similar so that the current image can be predicted relatively accurately from the previous reconstructed images.

Figure 7:
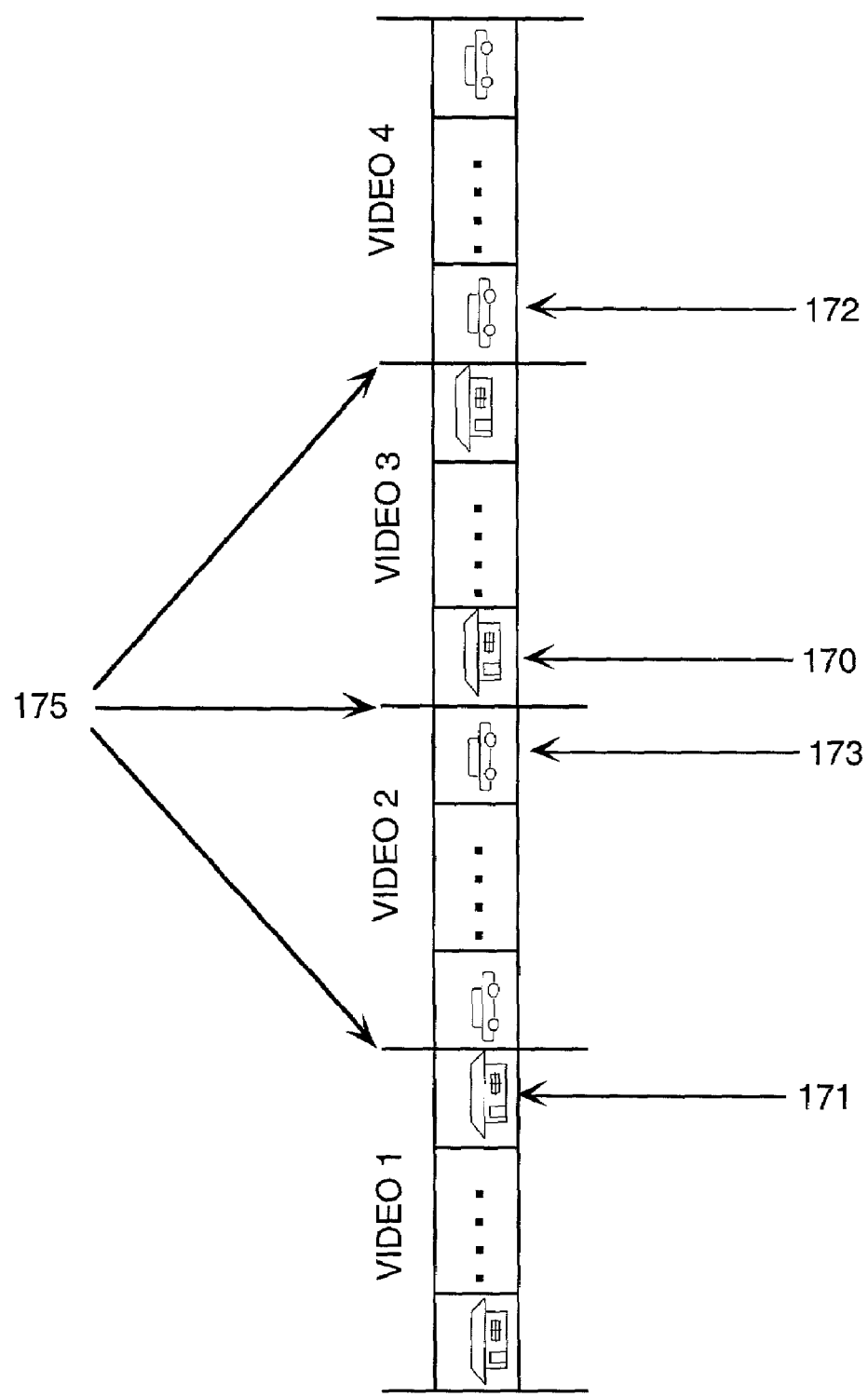
FIG. 7 shows an example of video signals that are constructed by alternatively concatenating video signals from two cameras.

A typical motion picture is produced by editing parts from video signals taken by several cameras. For instance, video signals from two or three cameras may be alternately concatenated as shown in FIG. 7. Generally, when the video signals of two or more cameras are alternately concatenated, it is of no use to try to predict the first frame after the boundary 175 from the previous reconstructed frames that come before the boundary 175. For instance, the first frame of a camera-scene cannot be predicted from frames of a different camera-scene. In such a case, most video compression algorithms give up trying to predict the current frame from the previous reconstructed frames and just transmit the first image of a new camera-scene without any motion compensation. However, transmitting the original image without prediction significantly increases the data size. However, if there are alternating video signals from several cameras, then the first frame of a camera-scene can be accurately predicted from previous frames that belong to the same camera-scene. For instance, in FIG. 7, the first frame 170 of VIDEO 3 can be accurately predicted from the last frame 171 of VIDEO 1 and the first frame 172 of VIDEO 4 from the last frame 173 of VIDEO 2. Thus, if one can determine which frames belong to the same camera-scene, this information is very useful for motion estimation and motion compensation. For this purpose, the present invention records a frame index and a camera identification number to each frame. With the frame index and camera identification number, one can easily determine which frames belong to the same camera-scene. Typically, a number of cameras are used to produce a motion picture. According to the teaching of the present invention, a different camera identification number would be assigned to each camera. The camera records the camera identification number and the frame index to each frame.

In practice, it is impractical and almost impossible to assign a unique number to each frame or a unique camera identification number to each camera since doing so requires a large number of bits. Instead, the number can be generated by a counter or selected from a sufficiently large pool of numbers. For instance, if the frame index is generated by a 32-bit-counter, the counter can index frames from 0 to 4,294,967,295. Assuming 30 frames per second, the 4,294,967,295 frames are equivalent to 39,768 hours of video signals, which is sufficient for a typical motion picture. On the other hand, the camera identification number can be selected from a sufficiently large pool of numbers so that no two cameras used in the same motion picture production may accidentally have the same camera identification number. In most cases, the number can be randomly selected from a sufficiently large pool of numbers. Since two cameras may accidentally have the same camera identification number, manual changing means is also provided so that a user can change the camera identification number manually. If a camera identification number is selected from a sufficiently large pool of numbers, such a problem will be very rare. In the present invention, the camera identification number and frame index are recorded for each frame as auxiliary information. Thus, if frames have the same camera identification number and similar frame indices, video compression algorithms may assume that the frames are similar and can be predicted from each other, even though they are far apart. For instance in FIG. 7, video signals from two cameras are alternately concatenated. As can be seen, VIDEO 1 and VIDEO 3 are taken by one camera. And VIDEO 2 and VIDEO 4 are taken by the other camera. In this case, conventional video compression algorithms give up trying to predict the first frame 170 of VIDEO 3 from the frames of VIDEO 2 and then transmit the original image, resulting in an increased data size. However, if the camera identification number and frame indices are available, the video compression algorithm can determine that the first frame 170 of VIDEO 3 can be predicted from the last frame 171 of VIDEO 1, assuming that the frame indices of the first frame 170 of VIDEO 3 and the last frame 171 of VIDEO 1 are similar. For instance, if the frame index of the first frame 170 of VIDEO 3 is 1404 and the frame index of the last frame 171 of VIDEO 1 is 1400, one may assume that the two frames are similar. However, if the difference between frame indices is large, it is more likely that the two frames are different. Other state signals of the camera, such as movement, focus state, aperture and zooming state, can be used to determine whether successive frames, which have similar frame indices, can be predicted from each other. In particular, the movement of the camera will provide valuable information on which frames can be used to predict the current frame.

Sometimes, a camera can be used to record several scenes that are completely different. In other words, a cameraman uses the camera to record a scene. Later, the cameraman uses the same camera to record a completely different scene. In this case, successive frames may come from completely different scenes, even though the scenes have the same camera identification number and similar frame indices. In this case, video compression algorithms may assume incorrectly that the frames belong to the same camera-scene. This is an undesirable phenomenon and should be avoided. In order to solve this problem, the present invention increases the frame counter by a large amount whenever the record button (or the pause button or the stop button) of the camera is pressed since pressing such buttons indicates that a new scene is being recorded. For example, the frame counter may be increased by 18,000, which is equivalent to 10 minutes, whenever the record button on the camera is pressed. Thus, two frames at the boundary will have very different frame indices.

Sometimes, a motion picture may include scenes taken by cameras over which the producer has no control. For example, in editing the motion picture, an editor may use videos taken by other producers. Accidentally, some scenes may have the same camera identification number, though they were taken by different cameras. In this case, the editor needs to change the camera identification number for one of the cameras. This can be done easily if all the video signals are recorded and edited in digital formats.

Figure 8:
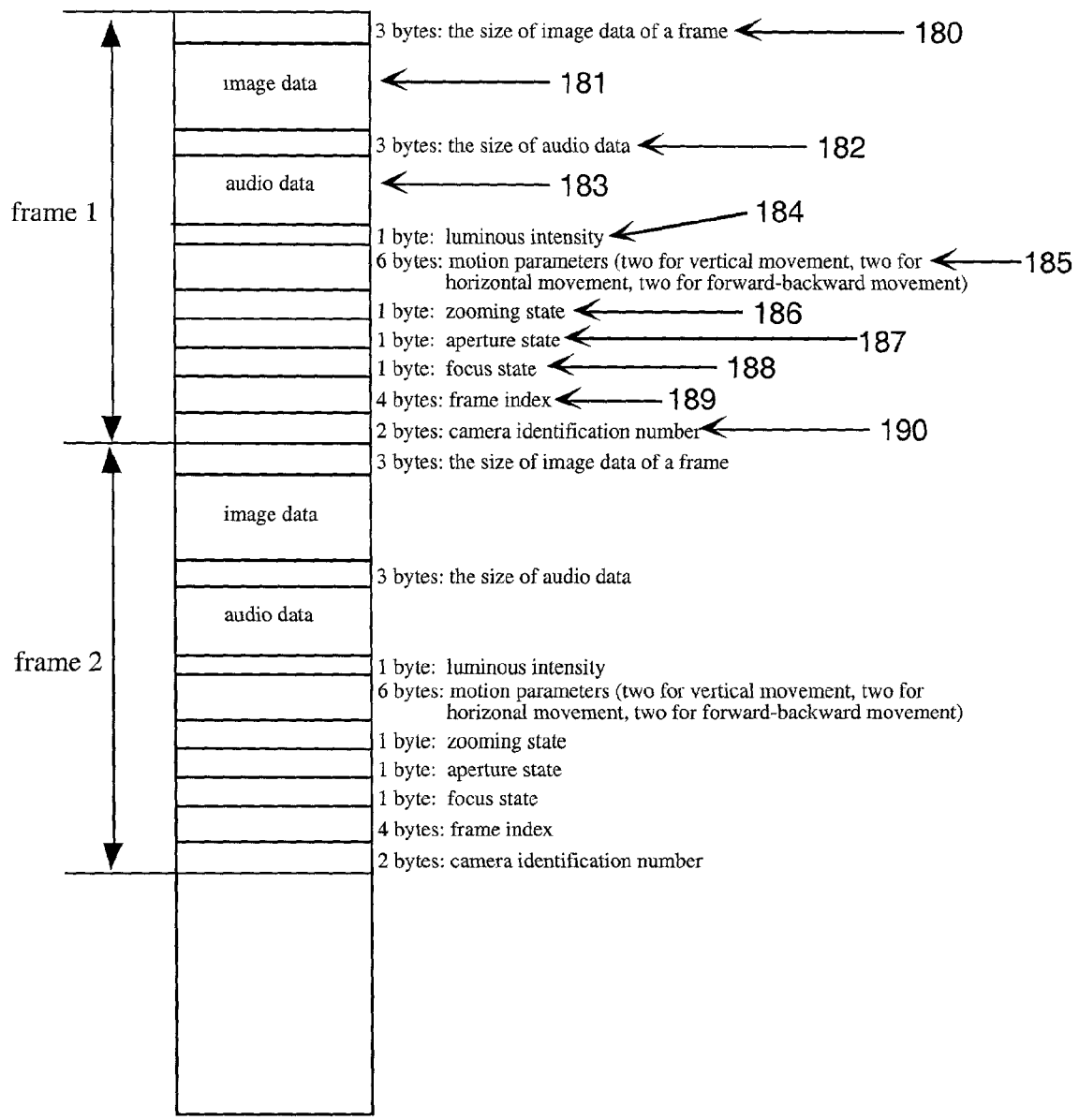
FIG. 8 shows an example of the data format.

According to the teaching of the present invention, the camera produces and records the various state signals in addition to video and audio signals. In order to distinguish among these signals, they need to be recorded in a predetermined data format. When signals are recorded in a digital format, there is high flexibility in recording these signals. FIG. 8 shows an example of such a data format. The first 3 bytes 180 indicate the size of the image data of a frame. The following data 181 are the image data and the following 3 bytes 182 correspond to the size of the audio data of the frame. The following data 183 are the audio data. The next one byte 184 represents luminous intensity and the movement parameters 185 of the camera follow. For the movement parameters of the camera, 6 bytes are assigned: two for vertical movement, two for horizontal movement and two for forward/backward movement. The next one byte 186 is for the zooming state and the following one byte 187 represents the aperture state. The next one byte 188 shows the focus state. The next 4 bytes 189 are assigned to the frame index and the following 2 bytes 190 to the camera identification number of the camera. It is noted that one may increase or decrease the numbers of bytes used to represent the various state signals depending on applications. For instance, if more accurate measurement of the zooming state is required, two bytes may be used to represent the zooming state.

Since all these state signals may need a considerable data block, some data compression techniques can be used. For example, instead of recording absolute values, one may record the difference between the value of the current frame and the value of the previous frame, provided that the first frame of a camera-scene has absolute values. Since these signals change slowly in most cases, the difference value can be represented with fewer bits. However, if the difference values are recorded, care should be taken when editing the videos. In other words, the first frame always needs to have absolute values. Furthermore, in order to reduce the data size, one may use other compression algorithms for the various state signals. It is noted that FIG. 8 is just an example of data formats for recording the various state signals along with video and audio signals. For instance, the number of bytes assigned to the various states may be changed. Furthermore, one can develop many other possible formats that can record the various state signals along with video and audio signals. It is also noted that the various state signals need not to be recorded for each frame of video signals. For instance, in order to reduce the data size, some of the various state signals may be recorded for every other frame.

Figure 9:
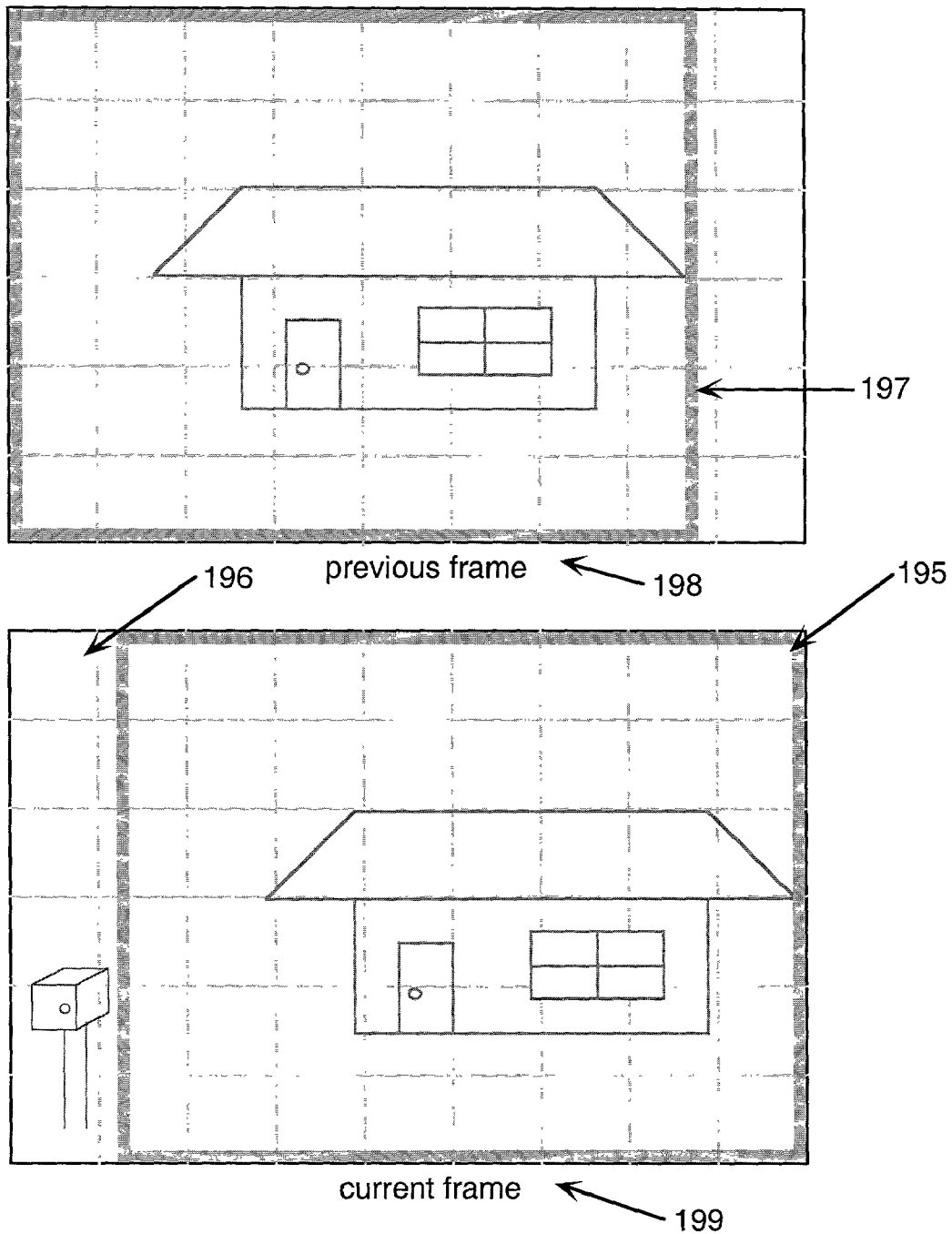
FIG. 9 shows how frames change when the camera is panned left.
Figure 10:
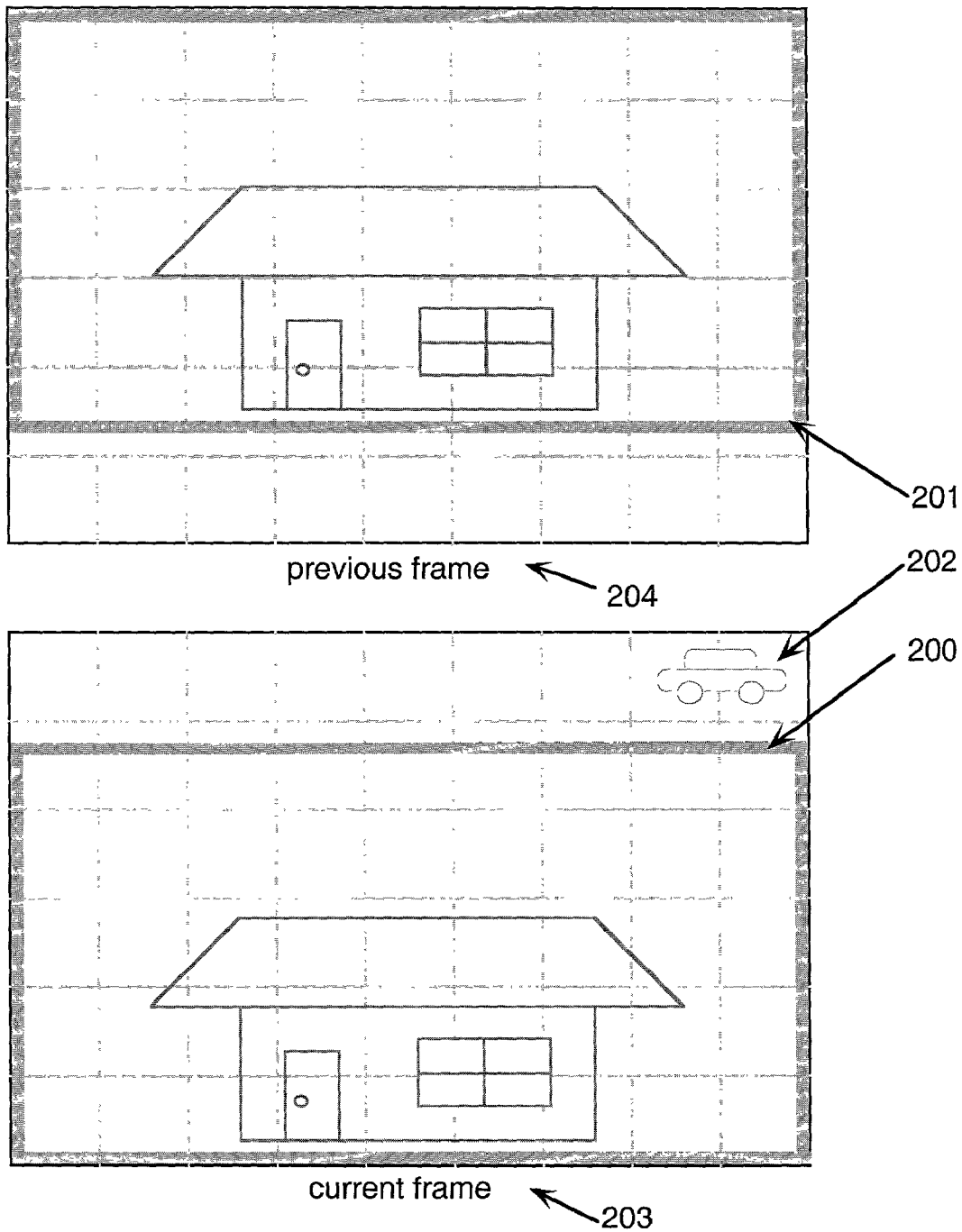
FIG. 10 shows how frames change when the camera is tilted up.

With the various state signals available, motion estimation and motion compensation can be done much more efficiently and accurately. For instance, the movement information of the camera provides helpful information in predicting how successive frames change. If the camera is panned left (FIG. 9), the compression algorithm may assume that a part 195, which is inside the gray box, of the current image 199 is a horizontally shifted version of the previous image 198. In other words, a part 195 of the current image is identical with a part 197 of the previous image. Since the remaining part 196 of the current image 199 may not be predicted from the previous image 198, it should be encoded without motion compensation. On the other hand, if the camera is tilted up (FIG. 10), a part 200 of the current image 203 is identical with a part 201 of the previous image 204. However, the remaining part 202 of the current image 203 cannot be predicted from the previous image 204 and should be encoded without motion compensation. As can be seen, when the movement information of the camera is available, successive frames can be accurately predicted in a very computationally efficient way except for some boundary areas that are coming into the view of the camera. Although the difference in successive frames due to the motion of objects can be reduced by using conventional motion estimation and compensation algorithms, the differences due to camera movement, change in zooming state, or change in aperture state of the camera can be reduced more effectively by using the various state signals of the camera. Since the motion estimation is the most time-consuming part in video compression algorithms, the present invention will significantly enhance the performance of video compression algorithms.

Figure 11:
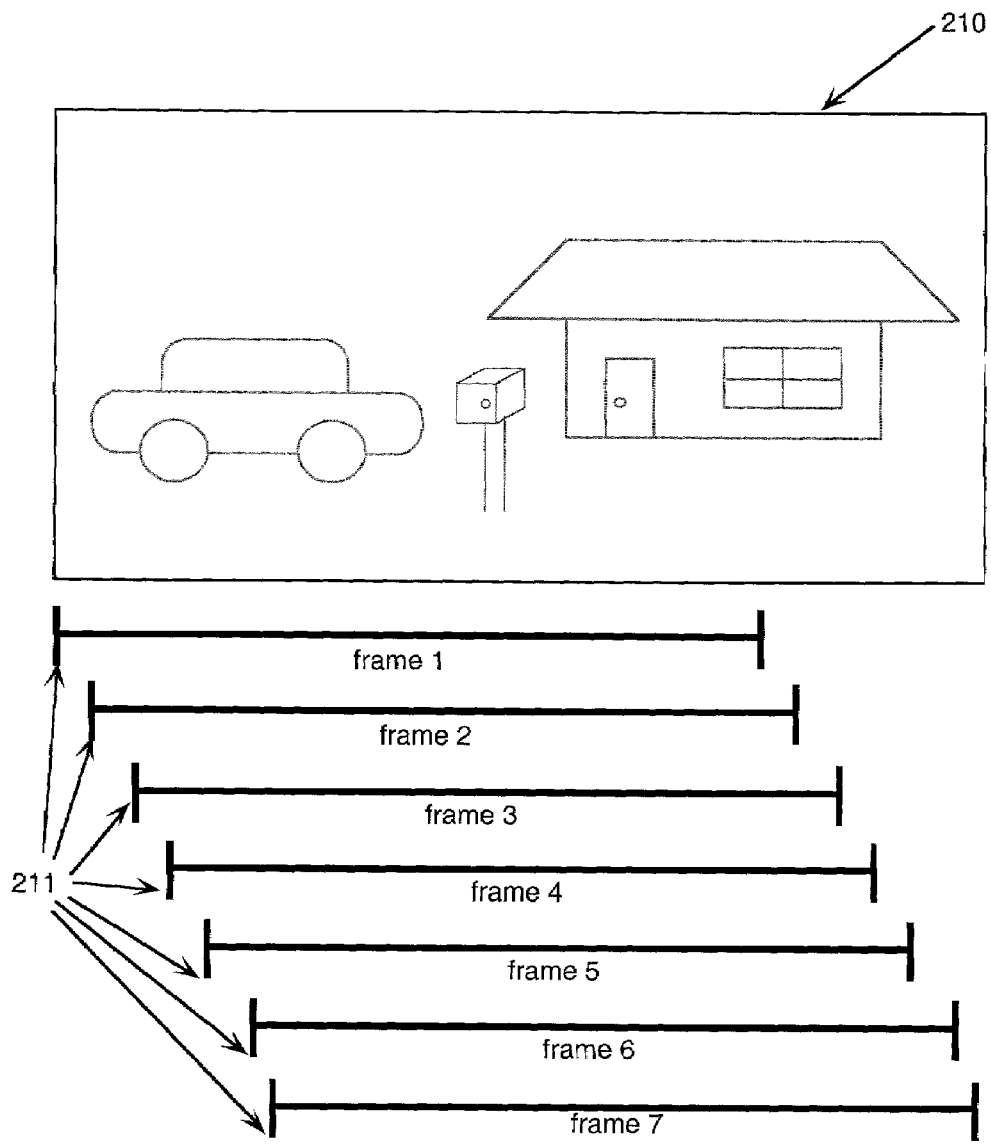
FIG. 11 illustrates how successive frames would change when the camera is being panned right.

If the camera is slowly panned, boundary areas, which come into view, will be small. In this case, one may first transmit the whole panoramic view 210 and then transmit the corresponding positions 211 of frames in the panoramic view 210 (FIG. 11). With the movement information available, this can be done easily and efficiently.

Figure 12:
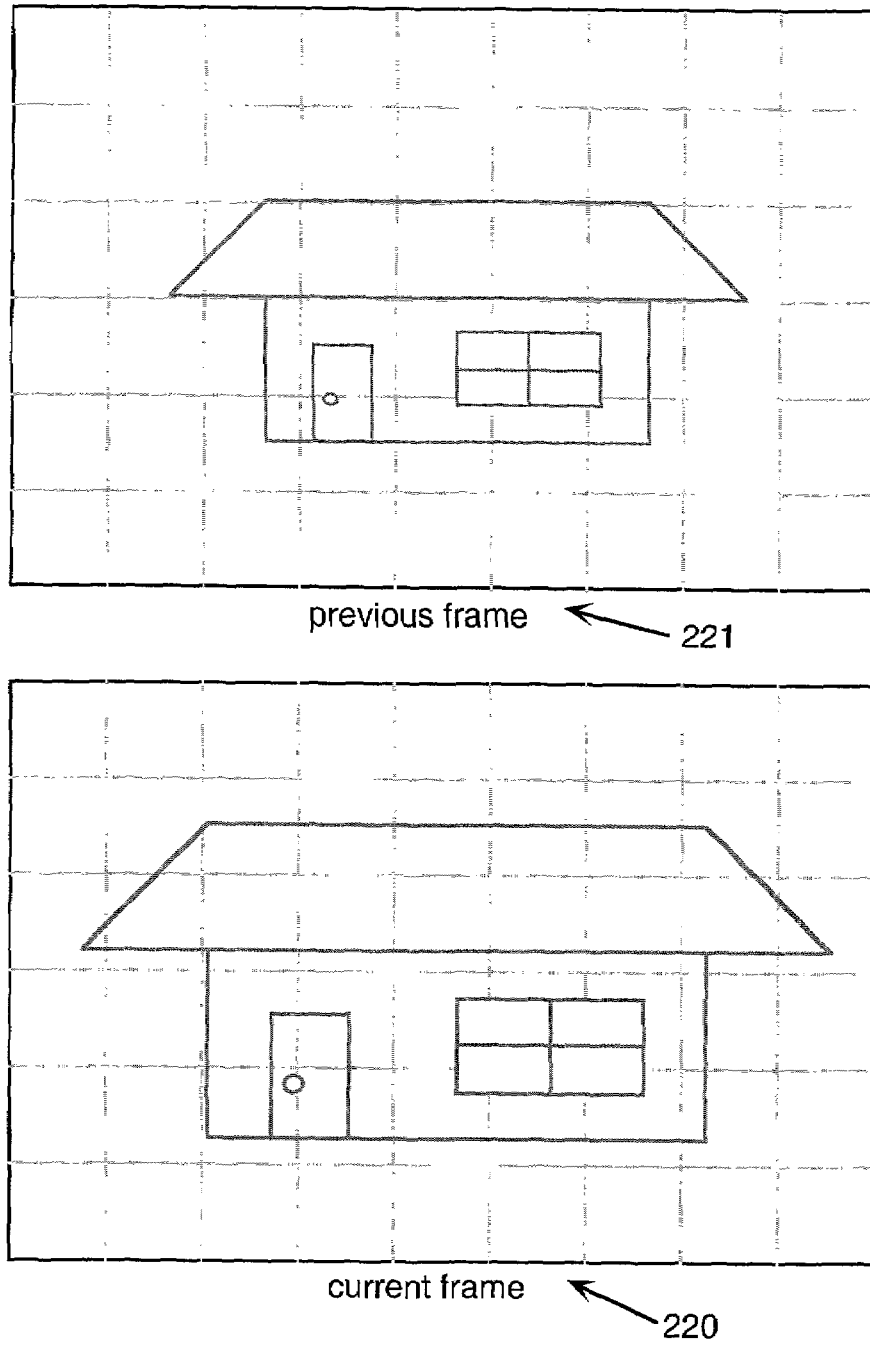
Figure 13:
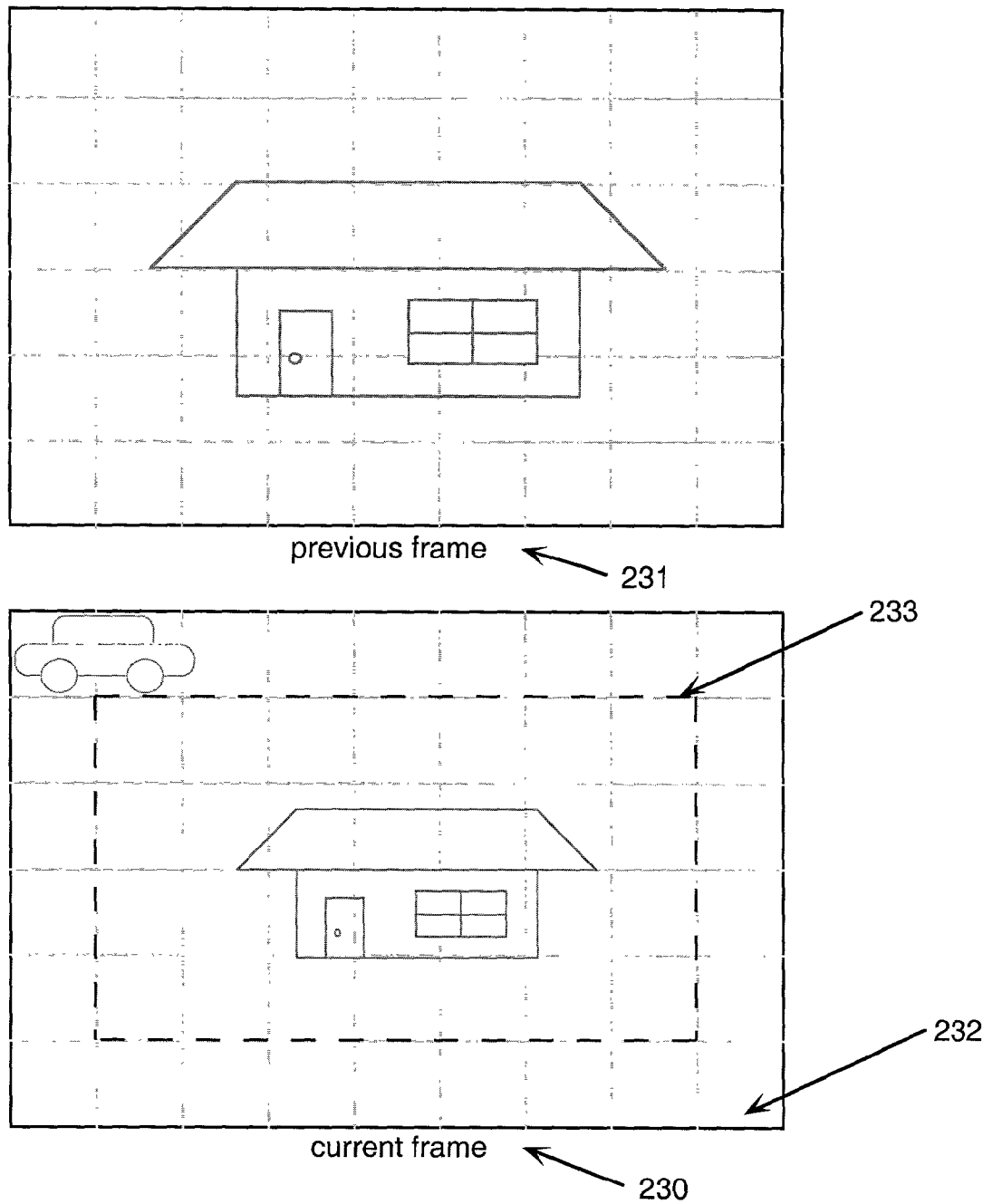
FIG. 13 shows how images change when the camera is zoomed out.

If the camera is being zoomed in, it is expected that objects in successive frames will become larger (FIG. 12). Thus, one can readily predict the current frame 220 from the previous frame 221 by an enlargement operation. If the camera is being zoomed out, it is expected that objects in successive frames become smaller (FIG. 13) and some area 232 of the current frame 230 may not be predicted from the previous frame 231. For example, in FIG. 13, the area 232 of the current frame 230, which is outside the dotted line 233, cannot be predicted from the previous frame 231. Thus, if the zooming state is available, one can take this information into account and design the video compression algorithm efficiently. In other words, before applying the motion estimation, one may enlarge or reduce the image depending on the change of the zooming state. Presently, most motion estimation algorithms assume that the zooming state remains the same. However, with the zooming state signal available, one can first resize images accordingly and then apply the motion estimation and compensation. As a result, one may obtain a better motion-compensated image, which will improve the efficiency of video compression.

The zoom-out operation can be viewed as the reverse of the zoom-in operation. In fact, if the final state 241 of the zoom-out operation (FIG. 15) is the initial state 230 of the zoom-in operation (FIG. 14) and the initial state 240 of the zoom-out operation is the final state 231 of the zoom-in operation, then the sequence of frames obtained by the zoom-out operation will be identical with the reverse of the sequence of frames obtained by the zoom-in operation assuming the zooming speed is identical (FIGS. 14–15). Depending on the characteristics of the video signals, a sequence of frames obtained by a zooming operation can be better compressed in either the zoom-in direction or in the zoom-out direction. Thus, with the zooming state signal available, one can choose the better direction and the efficiency of video compression can be improved.

Similarly, the aperture state signals provide useful information for predicting a frame from other frames. For instance, if the aperture state is changed while the surrounding light condition remains the same, one may expect that the intensity levels of successive frames will change accordingly. Thus, the aperture state signals along with luminosity signals provide valuable information in predicting the intensity levels of successive frames.

The focus state signals provide information on how the object of interest is moving. From the focus state signals, one can compute the distance between the camera and the object of interest. In other words, from the focus state signals, one can determine whether the object of interest is moving toward or away from the camera. If the object of interest is coming toward the camera, it will become larger in successive frames. If the object of interest is moving away from the camera, it will become smaller in successive frames. Thus, the focus state signals will be helpful in predicting a frame from other frames. Therefore, with the focus state signals available, the efficiency of video compression can be significantly improved.

Each state signal of the camera provides helpful information to predict a frame from other frames, and all of this information needs to be combined to make a final prediction. Thus, prediction combining means is provided, which makes a final prediction by combining various predictions that are made by using the various state signals of the camera. It is noted that the various state signals of a video camera can also be used to enhance the performance of the conventional motion estimation and compensations. For instance, the block matching algorithm can use the various state signals of the camera to guide the search of a block in previous reconstructed frames, which most closely matches the block being encoded.

Since a typical object of interest is three dimensional, the three-dimensionality of objects should be taken into account in predicting a frame from other frames using the various state signals of a video camera.

Figure 17:
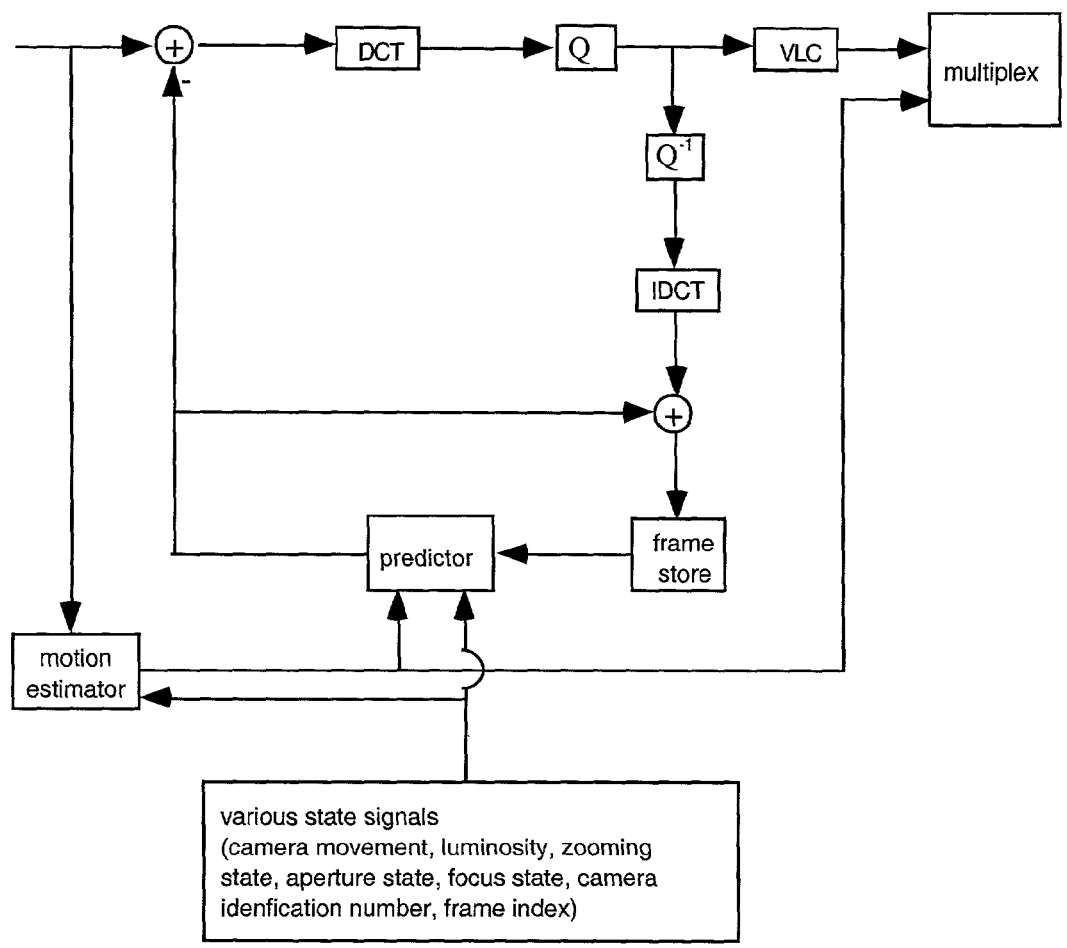
FIG. 17 shows a block diagram of a video encoder utilizing the various state signals of the camera for motion compensation.

FIG. 17 shows an exemplary block diagram of a video encoder that utilizes the various state signals in predicting the current frame from previous reconstructed frames.

Embodiment 2

Recent digital still cameras, which were initially designed to take still pictures, can record videos using video compression algorithms and many video cameras have the capability to take still pictures. In the future, it is expected that the distinction between digital still cameras and video cameras will be blurred. When digital cameras record videos using video compression algorithms, the teaching of the present invention can be applied. Currently, the motion estimation is one of the most time-consuming operations in video compression and requires a powerful processor for good motion estimation. As a result, motion estimation is a limiting factor in the performance of a video camera that has video compression capability since the processor equipped to the video camera has limited processing power compared to desktop computers. Since it is possible to develop efficient motion estimation and video compression algorithms with the teaching of the present invention, the performance of these video cameras that have video compression capability can be significantly enhanced.

In the video camera that has video compression capability using the various state signals, some of these various state signals are unnecessary for video compression. For instance, the camera identification number and frame index are not used since the video compression algorithm can always assume that video signals are shot by the same camera. However, these state signals will be useful for future editing. On the other hand, the other state signals, which include camera movement signals, luminosity signals, zooming state signals, aperture state signals, and focus state signals, will provide useful information for video compression algorithms. Furthermore, all of these state signals can be saved along with the compressed video signals for further compression and future editing.

Figure 18:
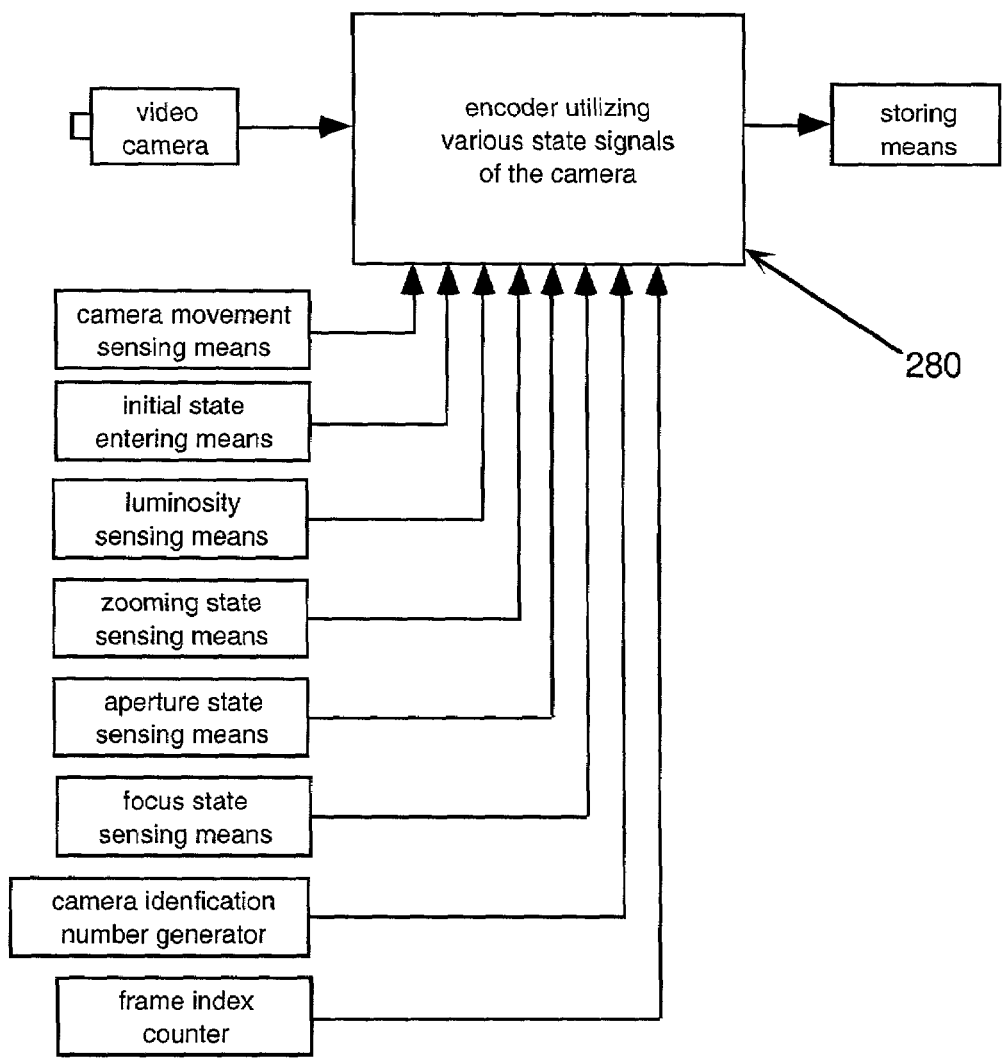
FIG. 18 illustrates the block-diagram of the video camera that has video compression capability using the various state signals.

FIG. 18 illustrates the block-diagram of the video camera that has video compression capability using the various state signals. The encoder 280 compresses video signals using some of the various state signals of the camera. Then, the compressed video signals are saved along with the various state signals. These various state signals are saved for further compression and future editing. In order to reduce the data size, one may choose not to save some of the various state signals. The data format for the video camera, which has video compression capability using the various state signals, may be similar to that of FIG. 8, though there are many other possible data formats.

Embodiment 3

In the present motion picture industry, many motion pictures are initially recorded using cameras that use traditional analog films. Typically, audio signals are recorded in sound track on the same analog films. In this case, it would be difficult to record various state signals on analog films since all these state signals may require additional bandwidth. Although one could develop a new analog film record format that has data track for the extra data, it would increase the size of the film and may be not comparable with existing equipment. In order to solve this problem, the present invention first converts the analog audio signal to digital format using sampling. Then the digital audio signal is compressed using audio compression algorithms such as MP3. Finally the compressed audio signal and the various state data are combined in a predetermined format, and then modulated and recorded in the sound track. Before modulating, the various state data may be compressed and coded using some error correction techniques.

There is another possible way to record the various state signals for analog films. One may record the state signals separately on digital media and combine those signals with video and audio signals when the video and audio signals are digitized. In this case, synchronization means should be provided.

What is claimed is:

1. A video camera with means to record various state signals of the video camera for efficient video compression, comprising:
   video signals;
   storing means for storing digital information;
   data format;
   video recording means that records said video signals in said storing means according to said data format;
   luminosity sensing means;
   luminosity recording means that receives luminosity signals from said luminosity sensing means and records said luminosity signals in said storing means according to said data format;
   movement sensing means that generates camera movement signals of the video camera;
   movement recording means that receives said camera movement signals from said movement sensing means and records said camera movement signals in said storing means according to said data format;

frame index generating means that generates a periodic frame index, which has a sufficiently large periodicity, and assigns it to each frame of said video signals;

frame index recording means that records said periodic frame index in said storing means according to said data format;

zooming state sensing means that generates zooming state signals of the video camera;

zooming state recording means that receives said zooming state signals from said zooming state sensing means and records said zooming state signals in said storing means according to said data format;

aperture state sensing means that generates aperture state signals of the video camera;

aperture state recording means that receives said aperture state signals from said aperture state sensing means and records said aperture state signals in said storing means according to said data format;

focus state sensing means that generates focus state signals of the video camera;

focus state recording means that receives said focus state signals from said focus state sensing means and records said focus state signals in said storing means according to said data format;

camera identification number generating means that selects a camera identification number from a sufficiently large pool of numbers;

camera identification number recording means that records said camera identification number, which is generated by said camera identification number generating means, in said storing means according to said data format; and initial state entering means that enters initial movements of the video camera when recording is started.

2. The video camera in accordance with claim 1 wherein said movement sensing means, which senses movements of the video camera, comprises an inertial navigation system.

3. The video camera in accordance with claim 1 wherein said frame index generating means comprises a counter that is increased by a large amount whenever new recording is started.

4. A method for predicting a frame from other frames utilizing various state signals of a video camera for efficient video compression, comprising:
   video signals;
   luminosity signals that are recorded for said video signals;
   luminosity based predicting means that predicts a frame from other frames by adjusting intensity levels according to differences of said luminosity signals;
   camera movement signals that are recorded for said video signals;
   movement based predicting means that predicts a frame from other frames by taking into account changes of said camera movement signals;
   frame indices that are recorded for said video signals;
   frame index based predicting means that predicts a frame from other frames using said frame indices;
   zooming state signals that are recorded for said video signals;
   zooming state based predicting means that predicts a frame from other frames by resizing according to changes of said zooming state signals;
   aperture state signals that are recorded for said video signals;
   aperture state based predicting means that predicts a frame from other frames by adjusting intensity levels according to differences of said aperture state signals;
   focus state signals that are recorded for said video signals;
   focus state based predicting means that predicts a frame from other frames by considering differences of distances between the video camera and an object of interest, which are computed using said focus state signals;
   camera identification numbers that are recorded for said video signals;
   camera identification number based predicting means that predicts a current frame from other frames whose camera identification numbers are identical with that of said current frame; and
   prediction combining means that makes a final prediction by combining various predictions made by said luminosity based predicting means, said movement based predicting means, said frame index based predicting means, said zooming state based predicting means, said aperture state based predicting means, said focus state based predicting means and said camera identification number based predicting means.

5. The method in accordance with claim 4 wherein said frame index based predicting means predicts a frame from other frames that have similar frame indices.

6. A video camera that has capability of video compression utilizing various state signals of the video camera in predicting a frame from other frames, comprising:
   video signals;
   audio signals;
   luminosity sensing means that generates luminosity signals for said video signals;
   luminosity based predicting means that predicts a frame from other frames by adjusting intensity levels according to differences of said luminosity signals;
   camera movement sensing means that senses movements of the video camera and generates camera movement signals;
   movement based predicting means that predicts a frame from other frames by considering changes of said camera movement signals;
   zooming state sensing means that generates zooming state signals of the video camera;
   zooming state based predicting means that predicts a frame from other frames by resizing according to changes of said zooming state signals;
   aperture state sensing means that generates aperture state signals of the video camera;
   aperture state based predicting means that predicts a frame from other frames by adjusting intensity levels according to differences of said aperture state signals;
   focus state sensing means that generates focus state signals of the video camera;
   focus state based predicting means that predicts a frame from other frames by considering differences of distances between the video camera and an object of interest, which are computed using said focus state signals;
   prediction combining means that makes a final prediction by combining various predictions made by said luminosity based predicting means, said movement based predicting means, said zooming state based predicting means, said aperture state based predicting means, and said focus state based predicting means;

frame index generating means that generates a periodic frame index, which has a sufficiently large periodicity, and assigns it to each frame of said video signals;

camera identification number generating means that selects a camera identification number from a sufficiently large pool of numbers;

initial state entering means;

data format;

storing means; and recording means that records said luminosity signals, said camera movement signals, said frame indices, said zooming state signals, said aperture state signals, said focus state signals, and said camera identification number along with compressed video signals and audio signals in said storing means according to said data format.

7. The video camera in accordance with claim 6 wherein said movement sensing means, which senses movements of the video camera, comprises an inertial navigation system.

8. The video camera in accordance with claim 6 wherein said frame index generating means comprises a counter that is increased by a large amount whenever new recording is started.

* * * * *